No. 839,532. PATENTED DEC. 25, 1906.
F. P. WILHELM.
SEEDING ATTACHMENT FOR PLOWS.
APPLICATION FILED APR. 18, 1906.

3 SHEETS—SHEET 1.

Witnesses
Inventor
F. P. Wilhelm
By
Attorneys

No. 839,532. PATENTED DEC. 25, 1906.
F. P. WILHELM.
SEEDING ATTACHMENT FOR PLOWS.
APPLICATION FILED APR. 18, 1906.
3 SHEETS—SHEET 3.
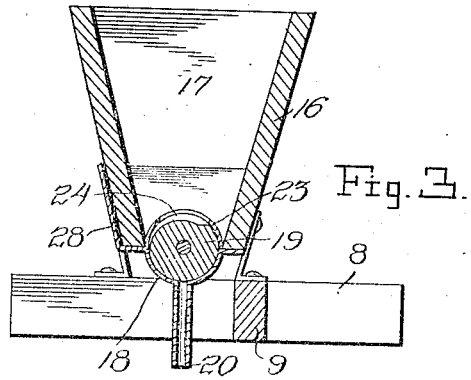
Fig. 3.
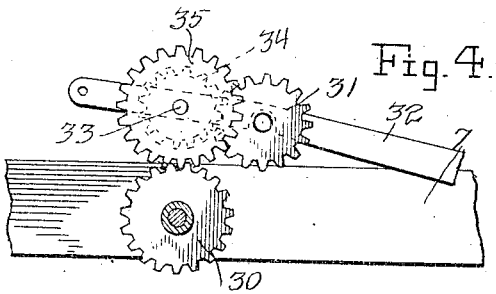
Fig. 4.
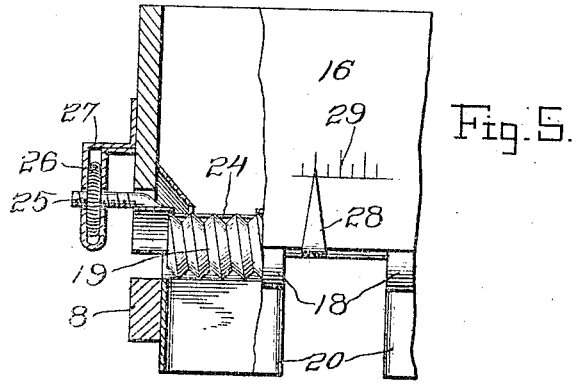
Fig. 5.
Witnesses
C. R. Reichenbach
F. B. MacNab
Inventor
F. P. Wilhelm.
By 
Attorneys.

UNITED STATES PATENT OFFICE.

FRANK P. WILHELM, OF POTOSI, WISCONSIN.

SEEDING ATTACHMENT FOR PLOWS.

No. 839,532.  Specification of Letters Patent.  Patented Dec. 25, 1906.

Application filed April 18, 1906. Serial No. 312,477.

*To all whom it may concern:*

Be it known that I, FRANK P. WILHELM, a citizen of the United States, residing at Potosi, in the county of Grant, State of Wisconsin, have invented certain new and useful Improvements in Seeding Attachments for Plows; and I do hereby declare the following to be a full, clear, and exact description of the invention, such as will enable others skilled in the art to which it appertains to make and use the same.

This invention relates to improvements in seeding attachments for plows; and the object in general thereof is to construct a device of that nature which may be attached to a plow of any desired description and which shall comprise a main frame with which the plow is connected and carrying a feed-hopper, the bottom of which is of trough shape and contains a duplex screw conveyer.

The invention also includes the use of a pair of floating gears for transmitting motion from the traction-wheel of the main frame to the screw-conveyer.

Further improvements consist in the attachment to the main frame of a disk-shaft carrying a series of covering-disks; and still further improvements include the means for adjusting the disk-shaft to any desired angle and for regulating the feed mechanism in the hopper.

With these and other objects in view the invention consists in the particular construction, combination, and arrangement of parts, all as hereinafter fully described, pointed out in the claims, and illustrated in the accompanying drawings, forming a part of this specification, and in which—

Figure 1:
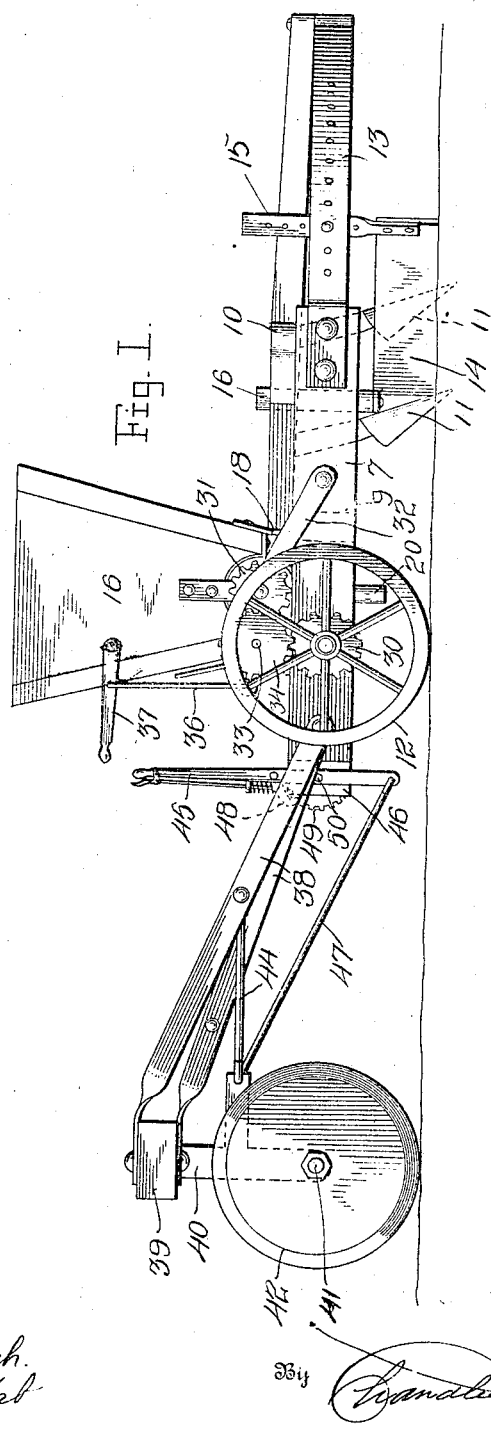
Figure 2:
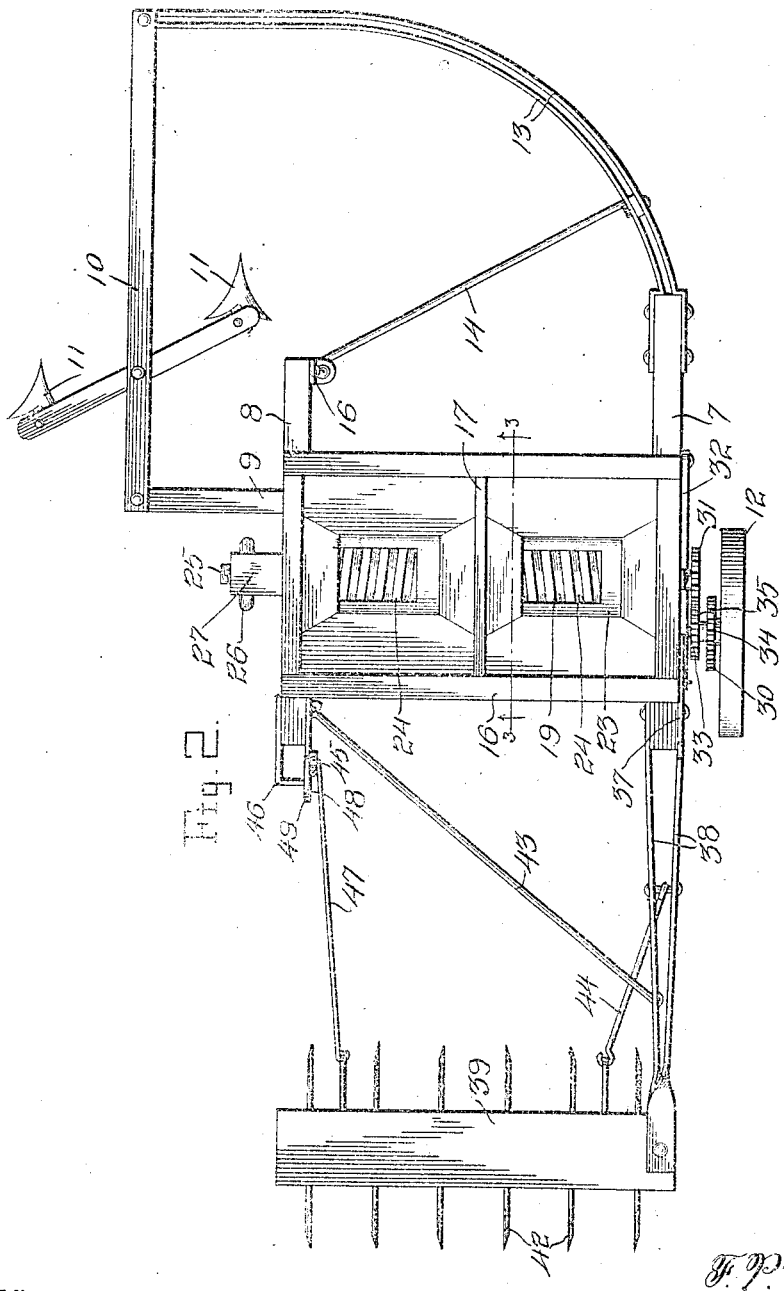

Figure 1 is a side elevation of a combined plow and seeder constructed in accordance with this invention. Fig. 2 is a top plan view of the same. Fig. 3 is a longitudinal vertical section on the line 3 3 of Fig. 1. Fig. 4 is a detail view in elevation of the floating gears, showing the same connected with the gears on the wheel and the feed-conveyer shaft. Fig. 5 is a detail view in elevation showing the means for regulating the feed from the hopper.

Similar parts are designated by the same reference-numerals in the several views.

Referring to the drawings the main frame of the machine is shown as comprising the side beams 7 and 8 and the cross-beam 9, connecting the side beams and extending beyond beam 8 for the attachment of the rear end of a plow-beam 10, carrying a pair of shovels 11 of any preferred description.

The frame is supported on one side by a traction-wheel 12, journaled in bearings in beam 7, and on the other by the rear end of the plow-beam, the front end of which is connected to a guide-beam 13, as shown, attached to the front end of beam 7. The rear portion of said guide-beam is bifurcated and provided with a series of alining perforations, there being a leveler 14, having one end pivotally connected with the front end of beam 8, as shown, and provided at its other end with a perforated upward extension 15, passing through the bifurcated portion of said guide-beam and adjustably retained in place therein by a bolt passing through the perforations in said guide-beam and extension, whereby the angle of the leveler with reference to the cross-beam may be varied, as desired.

Mounted upon the upper portion of the frame is a feed-hopper 16, provided with a dividing-plate 17, as shown, and with a removable cover. To the under face of said hopper is attached a pair of curved plates 18, spaced apart and forming a trough, in which the screw conveyer 19 works, each plate having a spout 20 connected therewith, through which the seeds are scattered. The screw conveyer is provided with right and left hand blades. Working in the lower portion of said hopper is a curved plate 23, embracing the upper portion of the conveyer and provided with a pair of longitudinally-extending feed-openings 24, located on respective sides of the V-shaped division-plate 17 in close proximity thereto. The outer end of said plate has connected thereto a screw 25, provided with a handwheel 26, through which said screw passes. To permit a longitudinal movement of said screw and retain the hand-wheel in place, there is attached to the adjacent hopper end a bracket 27, embracing said wheel on both sides thereof and provided with alining openings to permit the passage of said screw therethrough. Plate 23 is provided with an extension 28, bent upwardly and around the rear side of the hopper to form a pointer, said side being calibrated, as at 29. It will thus be seen that by moving the hand-wheel in one direction or the other a corresponding longitudinal movement of plate 23 will result and that the feed from said hopper may be in this way exactly regulated, the pointer indicating the corresponding figures on the calibrated hopper side.

The traction-wheel carried by the side beam 7 is provided on its hub with a gear 30, while the corresponding end of the screw conveyer is provided with a gear 31. Pivoted to the outer side of beam 7 is a metal rod 32, carrying a stub-shaft 33, on which are located a pair of floating gears 34 and 35, adapted to mesh, respectively, with gears 30 and 31 on the wheel-hub and conveyer. To the outer end of rod 32 is connected a link 36, pivoted at its opposite end to a lever 37. It will be therefore apparent that by moving lever 37 downwardly the floating gears will be moved into mesh with the wheel-hub and conveyer-gears and that motion will thus be transmitted from said wheel to operate the conveyer. A movement of lever 37 in the opposite direction will in like manner release the floating gears from engagement with the hub-gear and conveyer-gear, and rotation of the conveyer will therefore cease.

Bolted to the rear end of beam 7 is a pair of braces 38, the opposite ends of which are attached to the upper portion of a disk-frame 39, as shown. Mounted in the extensions 40 of said frame is a disk-shaft 41, carrying a plurality of circular disks 42. The diagonal brace 43 connects the main braces 38 with beam 8, as shown, while one of the extensions 40 is connected, by means of an eyebolt 44, with the main braces 38, as shown.

The angle of the covering-disks may be adjusted by means of a lever 45, journaled in the bracket 46 at the rear end of beam 8 and having its lower end connected, by means of a link 47, with the corresponding extension of the disk-frame.

The movement of the lever 45 in one direction or the other will accordingly result in a corresponding movement of the disk-frame by means of the link connection between the two, and the angular position of said disk-frame may therefore be exactly adjusted. The disk-frame is retained in its adjusted position by means of a spring-pressed pawl 48, carried on the lower end of a supplemental lever attached to the lever 45 and adapted to lock with the teeth of a ratchet 49, fastened upon the pivot 50, upon which lever 45 is pivoted.

Owing to the provision of the curved plate, which embraces the upper portion of the screw conveyer and has its openings approaching the sides of the division-plate, it will be obvious that the feed from the hopper may be completely regulated as desired, as the operative extent of the feed-openings in said plate may be adjusted at will by moving said plate in one direction or the other. It will likewise be apparent that the partitions of the hopper may contain different kinds of grain.

Although in the present instance the hopper is shown as having a single division-plate and the plow-beam as provided in consequence with but two shovels, it will be readily understood that two or three division-plates may be made use of, in which case the curved plate will be provided accordingly with three or four feed-openings, there being a corresponding number of spout-plates carried by the hopper and of shovels secured to the beam.

Owing to the provision of a leveler at the forward end of the frame the ground will be smoothed or planed to a certain extent and the clods, stones, &c., will be thrown toward the plow side of the machine.

The operation of the machine will be readily understood from the above, and further description therefore is thought unnecessary.

Obvious modifications and changes may be made within the scope of the claims without departing from the spirit of the invention, which is not intended to be limited to the exact description shown and described.

What is claimed is—

1. A seeding attachment for plows comprising a supporting-frame; a traction-wheel carried by said frame; a gear secured to the hub of said traction-wheel; a feed-hopper mounted upon said frame; a screw conveyer rotatably mounted within said hopper; a gear secured to the end of said conveyer adjacent said traction-wheel; a lever pivoted to said frame; a pair of gears carried by said lever; and a lever pivoted to said hopper and connected with said first-mentioned lever for actuating the same, to move the gears carried thereon into and out of mesh with the gears on said conveyer and the hub of said wheel.

2. A seeding attachment for plows comprising a supporting-frame, a traction-wheel carried by said frame, a divided feed-hopper mounted upon said frame, and provided with a screw conveyer having right and left hand blades, a curved plate embracing the upper portion of said conveyer and provided with longitudinally-extending openings adjacent the division-plate in said hopper, a screw connected to one end of said curved plate, a hand-wheel mounted upon said screw for rotating the same, to effect a corresponding movement of said curved plate, longitudinally of said conveyer, and gear connections between the hub of said traction-wheel and said conveyer for rotating said conveyer.

3. A seeding attachment for plows comprising a supporting-frame, a traction-wheel carried by said frame, a divided feed-hopper mounted upon said frame, and provided with a screw conveyer having right and left hand blades, a curved plate embracing the upper portion of said conveyer and provided with longitudinally-extending openings adjacent the division-plate in said hopper, a screw connected to one end of said curved plate, and a hand-wheel mounted upon said screw for rotating the same to effect a corresponding movement of said curved plate longitudinally of said conveyer, a gear on one end of said conveyer, a gear upon the hub of the adjacent traction-wheel, a pair of floating gears carried by said frame, and means for moving said floating gears into and out of mesh with said first-mentioned gears.

In testimony whereof I affix my signature in presence of two witnesses.

FRANK P. WILHELM.

Witnesses:
C. J. RAGATZ,
THOS. R. SEATON.